Sept. 4, 1945.  L. S. MEYER  2,384,387
TREATMENT OF UREA-FORMALDEHYDE RESIN FOAM
Filed Dec. 4, 1943
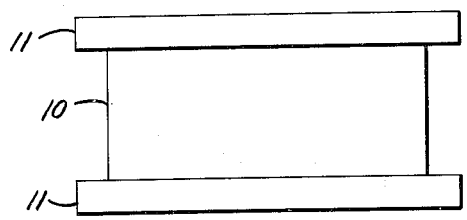
Fig. I
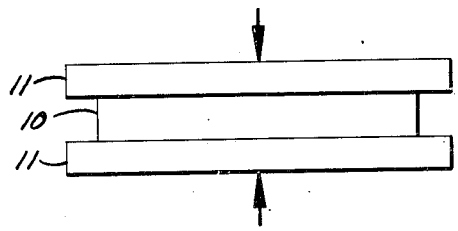
Fig. II
Fig. III
INVENTOR.
Leonard S. Meyer
BY
Marshall & Marshall
ATTORNEYS

UNITED STATES PATENT OFFICE 2,384,387

TREATMENT OF UREA-FORMALDEHYDE RESIN FOAM

Leonard S. Meyer, Toledo, Ohio, assignor to Libbey-Owens-Ford Glass Company, Toledo, Ohio, a corporation of Ohio Application December 4, 1943, Serial No. 512,973

3 Claims. (Cl. 18—48)

The invention relates to the treatment of urea-formaldehyde resin foam to improve its physical properties.

A urea-formaldehyde resin foam is produced by whipping an aqueous solution of a urea-formaldehyde reaction product containing a foaming agent and a hardening agent, and then allowing the resulting foam to gel or harden. A urea-formaldehyde resin foam is an excellent insulating material. Because of its extremely light weight, it can be used to fill dead air spaces so as to prevent convection currents without materially adding to the weight of the structure. In addition it is valuable for filling dead air spaces in aircraft within which explosive mixtures would be likely to form in case of leakage of fuel tanks.

Unfortunately, however, urea-formaldehyde resin foam is extremely fragile because its structural strength is very low. It has no resilience so that the slightest abrasion causes portions of the foam to crumble away.

The principal object of the invention is the treatment of a hardened urea-formaldehyde resin foam to impart strength and resilience. More specific objects and advantages are apparent from the description, in which reference is had to the accompanying drawing illustrating the treatment of a block of foam.

Figure I of the drawing is a diagrammatic view in elevation of a block of foam between platens before pressure is applied.

Figure II is a similar view showing the positions of the parts after application of full pressure.

Figure III is an elevation of the block of foam after removal from the press.

This specific drawing and the specific description that follows merely disclose and illustrate the invention and are not intended to impose limitations upon the claims.

A urea-formaldehyde resin foam can be produced with a specific gravity of about 0.01 to about 0.04. The lower the specific gravity, the more fragile is the foam. On the other hand, if the aqueous solution is whipped to a lesser extent, so as to produce a foam of relatively high specific gravity, the resulting foam has a tendency to crack and disintegrate upon drying out. If a finely divided cellulosic filler is incorporated in the original aqueous solution, it is possible to produce a foam with a specific gravity as high as .05 which does not disintegrate seriously upon drying.

In any case, however, a urea-formaldehyde resin foam is fragile enough so that it is difficult to handle without disintegration.

The present invention is based upon the discovery of a method by which a urea-formaldehyde resin foam, after it has been produced, can be treated to give it resilience and appreciable strength. The present method comprises the step of substantially reducing the volume of a hardened urea-formaldehyde resin foam by compressing it at a temperature high enough to prevent disintegration. This treatment causes the foam to acquire for the first time the property of resilience. At the same time there is an increase in strength that is roughly inversely proportional to the change in the volume of the foam.

Although a hardened urea-formaldehyde resin foam is extremely fragile at ordinary temperatures, it has been discovered that the foam is to some extent a thermoplastic material. It has been discovered further that when the foam is brought to an elevated temperature to take advantage of its thermoplastic character, its volume can be substantially reduced by compression, without disintegration. It has been discovered still further that after such treatment, the foam has a firm shell or skin which renders the foam for the first time resistant to abrasion. The newly acquired property of resilience enables the product to be bent slightly without fracturing.

The great reduction in fragility produced by the present method vastly increases the usefulness of the product because it makes it possible to use the product as a construction material without prohibitive losses by breakage and disintegration.

The starting material in the production of a urea-formaldehyde resin foam is an aqueous solution of a urea-formaldehyde condensation product. The concentration of the solution should be such as to produce a foam of the desired specific gravity in the whipping apparatus employed, and may be as high as 45 per cent. If the solution is too concentrated, it is so viscous that it cannot be whipped into a foam of the desired low specific gravity. If a filler is employed, the concentration of the urea-formaldehyde condensation product in the solution must be less and the proportion of fibrous filler should also be limited so that the viscosity of the composition is not excessive.

The amount of foaming agent employed is simply an amount sufficient to produce a foam of the desired specific gravity. The hardening agent is an acid substance that causes the urea-formaldehyde condensation product to harden into an insoluble resin. Any organic or inorganic acid, acid salt or other acid substance may be employed, such as maleic acid, phosphoric acid or ammonium chloride.

After the solution has been foamed, the foam immediately begins to collapse, so that it is necessary to use enough hardening agent so that the foam gels or hardens while it still has the desired low specific gravity. The amount of hardening agent used is an amount great enough to cause the foam to harden while it still has the desired low specific gravity, but not great enough to cause hardening to interfere with the foaming of the solution.

In the preparation of a foamable, aqueous solution of a urea-formaldehyde condensation product, it usually is desirable to carry the urea-formaldehyde reaction as far as it can be carried without precipitation. A suitable solution of a urea-formaldehyde reaction product may be prepared as follows: urea and formaldehyde in a molar ratio of 1:2 are gently refluxed in an aqueous solution that has been brought to pH 5–5.5 by addition of sodium hydroxide. After the refluxing has been continued long enough (about one hour) to carry the reaction to the desired stage, the solution is neutralized. The resulting solution can be diluted moderately if desired without causing precipitation.

The foaming agent used may be selected from a great variety of well-known foaming agents. The foaming agent may be any one that is not so alkaline as to interfere with the use of acid to harden the urea-formaldehyde condensation product. A foaming agent such as crude butylated naphthalene sulfonic acid may be used which is sufficiently acid so that it serves as the hardening agent as well as the foaming agent.

In the production of the foam, an aqueous solution of the foaming agent may be charged into the whipping apparatus, and whipped into a foam before the addition of the aqueous solution of the urea-formaldehyde condensation product. The aqueous solution employed, for example, may be a 25 per cent solution of the condensation product containing about 5 per cent by weight of finely divided wood flour. Additional modifiers may be used as in any urea-formaldehyde composition.

The solution is whipped to a foam of the desired specific gravity and is allowed to harden in any desired shape to form a sheet, a block 10 or another body of hardened foam. The acidity of the solution should be such that the foam hardens within about fifteen minutes after the end of the whipping operation. Preferably the foam as soon as it is hardened is placed in a drier and dried at a gradually rising temperature.

The compression of a block 10 of hardened urea-formaldehyde resin foam produced by the foregoing procedure or any other procedure may be carried out between heated platens 11. The pressure should not be applied until the foam has heated sufficiently so that it has begun to become plastic.

The temperature employed depends upon the degree to which the foam is to be compressed, and is simply a temperature high enough to prevent the foam from disintegrating during the compressing operation that is used. The preferred temperature is about 100° C. or more. At such temperatures the foam may be compressed to about one-third of its original volume or thickness, as illustrated in Figure II. When so compressed, the foam springs back so as to regain about one-fourth of the loss of volume, upon release of the pressure as illustrated in Figure III. If the foam is compressed very slowly and carefully, or particularly if the foam is not compressed to such a great degree, lower temperatures may be employed.

The present method may be carried out at such temperatures by producing any substantial reduction in the volume of the foam by compression. For example, the final product may have from one-third to two-thirds the volume of the uncompressed foam.

Various embodiments of the invention may be devised to meet various requirements.

Having described my invention, I claim:

1. A method of imparting strength and resilience to a hardened urea-formaldehyde resin foam that comprises substantially reducing the volume of the foam by compressing at a temperature high enough to render the foam sufficiently plastic so that it is not disintegrated by the compressing operation.

2. A method of imparting strength and resilience to a hardened urea-formaldehyde resin foam that comprises substantially reducing the volume of the foam by compressing between heated platens at a temperature high enough to render the foam sufficiently plastic so that it is not disintegrated by the compressing operation.

3. A method of imparting strength and resilience to a hardened urea-formaldehyde resin foam that comprises reducing the volume of the foam to about one-half by compressing between heated platens at a temperature high enough to render the foam sufficiently plastic so that it is not disintegrated by the compressing operation.

LEONARD S. MEYER.